(12) United States Patent
Friesen et al.

(10) Patent No.: US 7,578,648 B2
(45) Date of Patent: Aug. 25, 2009

(54) FRONT LATCH SYSTEM FOR A FRONT END LOADER

(75) Inventors: Henry Friesen, Niagara-on-the-Lake (CA); Radu Traian Guja, Welland (CA)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/959,037

(22) Filed: Dec. 18, 2007

(65) Prior Publication Data

US 2009/0087291 A1 Apr. 2, 2009

Related U.S. Application Data

(60) Provisional application No. 60/976,133, filed on Sep. 28, 2007.

(51) Int. Cl.
*E02F 3/627* (2006.01)
(52) U.S. Cl. ...................... 414/686; 172/275
(58) Field of Classification Search ............... 414/686; 172/272–275
See application file for complete search history.

(56) References Cited

U.S. PATENT DOCUMENTS

| 3,939,997 | A | * | 2/1976 | Frank | ............. 414/686 |
| 4,217,075 | A | * | 8/1980 | Frank | ............. 414/686 |
| 5,387,076 | A | | 2/1995 | Fuzzen | |
| 5,388,950 | A | | 2/1995 | Schmahl et al. | |
| 5,531,561 | A | | 7/1996 | Rae et al. | |
| 6,247,888 | B1 | | 6/2001 | Guiet | |
| 7,168,907 | B2 | | 1/2007 | Lyons et al. | |
| 2006/0182592 | A1 | * | 8/2006 | Stender et al. | ............. 414/686 |

* cited by examiner

*Primary Examiner*—Donald Underwood

(57) ABSTRACT

A work machine includes a frame and a front latch system carried by the frame at a front end of the work machine. The latch system includes a pair of laterally spaced, generally horizontally oriented slots, with each slot defined by an upper edge and a lower edge. The upper edge is longer than the lower edge and extends forward of the lower edge. A loader includes a pair of laterally spaced braces, with each brace having a distal end configured for contacting the ground when the loader is detached from the frame. A cross member coupled between the braces is received within the slots of the front latch system.

7 Claims, 10 Drawing Sheets

FRONT LATCH SYSTEM FOR A FRONT END LOADER

CROSS-REFERENCE TO RELATED APPLICATIONS

This is a non-provisional application based upon U.S. provisional patent application Ser. No. 60/976,133, entitled "FRONT LATCHING SYSTEM FOR A FRONT END LOADER", filed Sep. 28, 2007.

FIELD OF THE INVENTION

The present invention relates to front end loaders used on work machines, and more particularly, to a front latch system for such front end loaders.

BACKGROUND OF THE INVENTION

Front end loaders for work machines such as agricultural or construction work machines are typically carried by the tractor frame. When the front end loader is not needed, it may be removed from the work machine and parked using a parking stand system. The parking stand system may take various forms, but commonly includes one or more stands which are pivoted downward and engage the ground by moving the loader frame to an at rest position in which the front implement (e.g., loader bucket) is resting on the ground. Usually this same movement of the loader frame to an at-rest position raises the bottom end of the vertical mast on either side of the tractor. The operator then disengages the quick-connect hydraulic fittings and simply backs away from the loader.

This type of parking stand system is effective to mount and dismount the loader from the tractor, but requires that the operator dismount from the work machine multiple times before backing away from the loader.

What is needed in the art is a front end loader which may be easily mounted and dismounted from the work machine frame, without requiring the operator to dismount multiple times from the work machine.

SUMMARY OF THE INVENTION

The invention in one form is directed to a work machine including a frame and a front latch system carried by the frame at a front end of the work machine. The latch system includes a pair of laterally spaced, generally horizontally oriented slots, with each slot defined by an upper edge and a lower edge. The upper edge is longer than the lower edge and extends forward of the lower edge. A loader includes a pair of laterally spaced braces, with each brace having a distal end configured for contacting the ground when the loader is detached from the frame. A cross member coupled between the braces is received within the slots of the front latch system.

The invention in another form is directed to a front latch system for coupling a loader to a front end of a frame on a work machine. The front latch system includes a mounting bracket having a pair of laterally spaced, generally vertically oriented plates. Each plate includes a generally horizontally oriented slot, with each slot defined by an upper edge and a lower edge. The upper edge is longer than the lower edge and extends forward of the lower edge.

The invention in yet another form is directed to a method of attaching a loader to a work machine, including the steps of: attaching a pair of masts to a frame of the work machine; moving a pair of braces at a forward end of the loader from a ground engaging position to a raised position; contacting a cross member extending between the braces against a bottom of an upper edge of a slot in a mounting bracket at the forward end of the frame; sliding the cross member to a base of the slot; and locking the pair of masts relative to the frame, thereby holding the cross member within the slot.

DETAILED DESCRIPTION OF THE INVENTION

Figure 1:
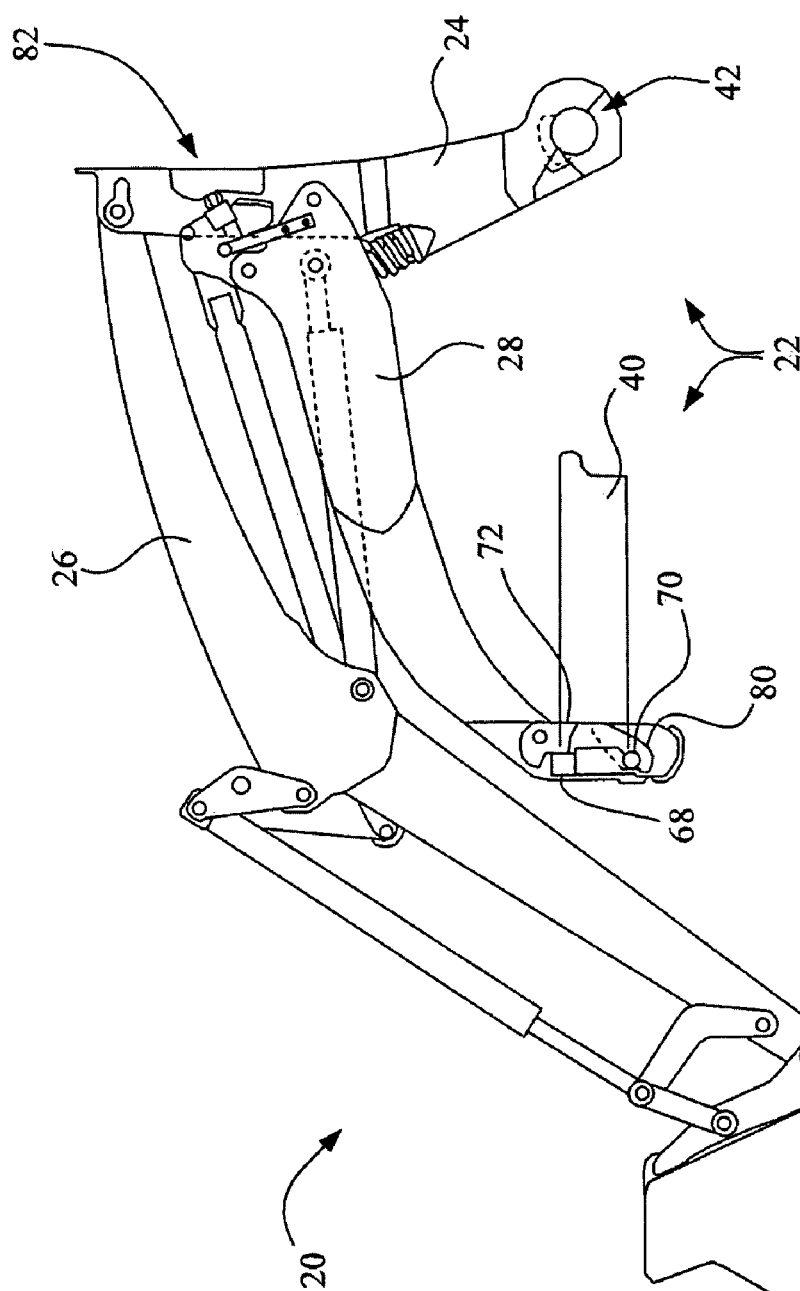
FIG. 1 is side view of a front end loader with a mast attachment configuration which may be used with the present invention, and different type of front latch system.
Figure 2:
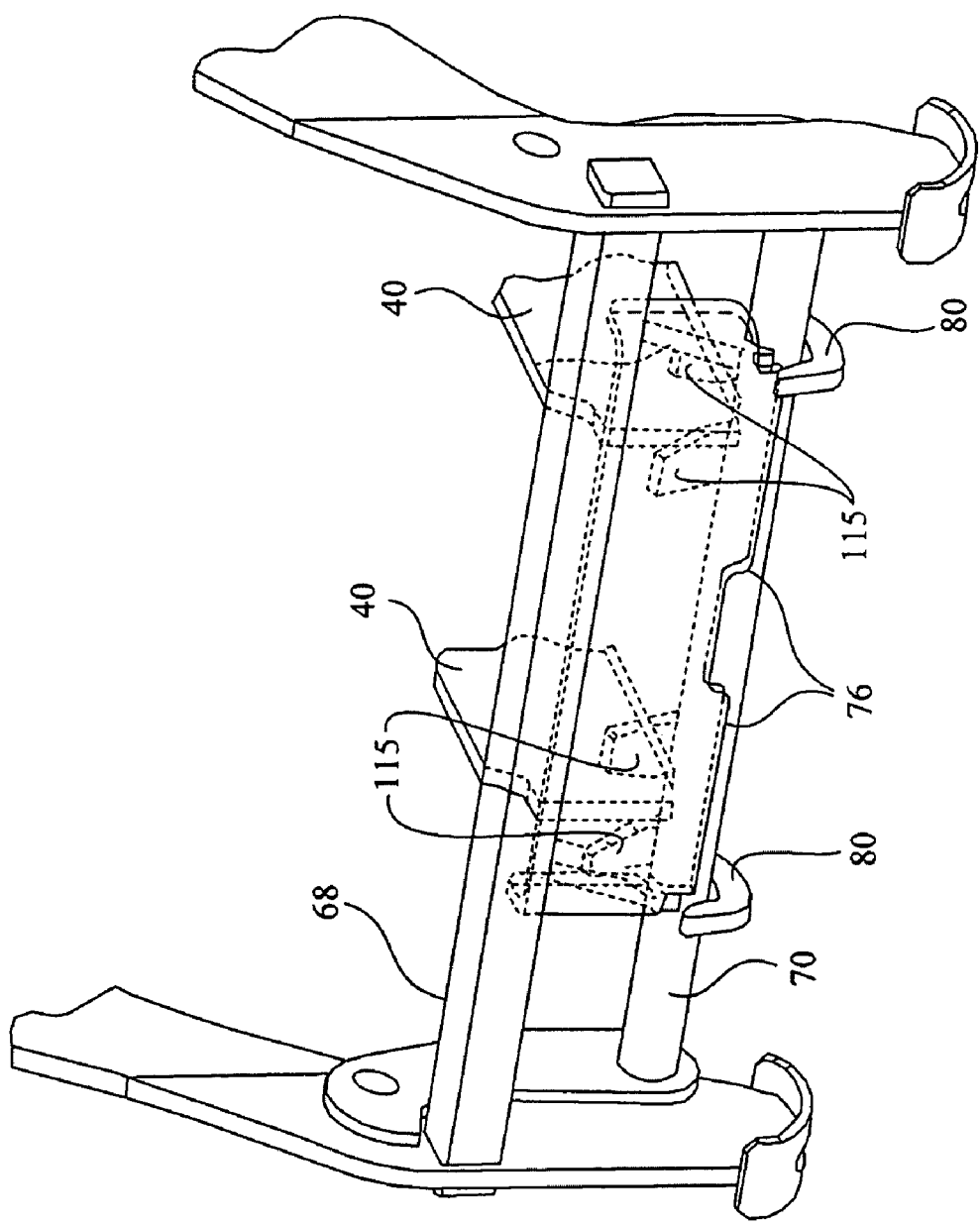
FIG. 2 is a fragmentary, perspective view of the front portion of the loader shown in FIG. 1.
Figure 3:
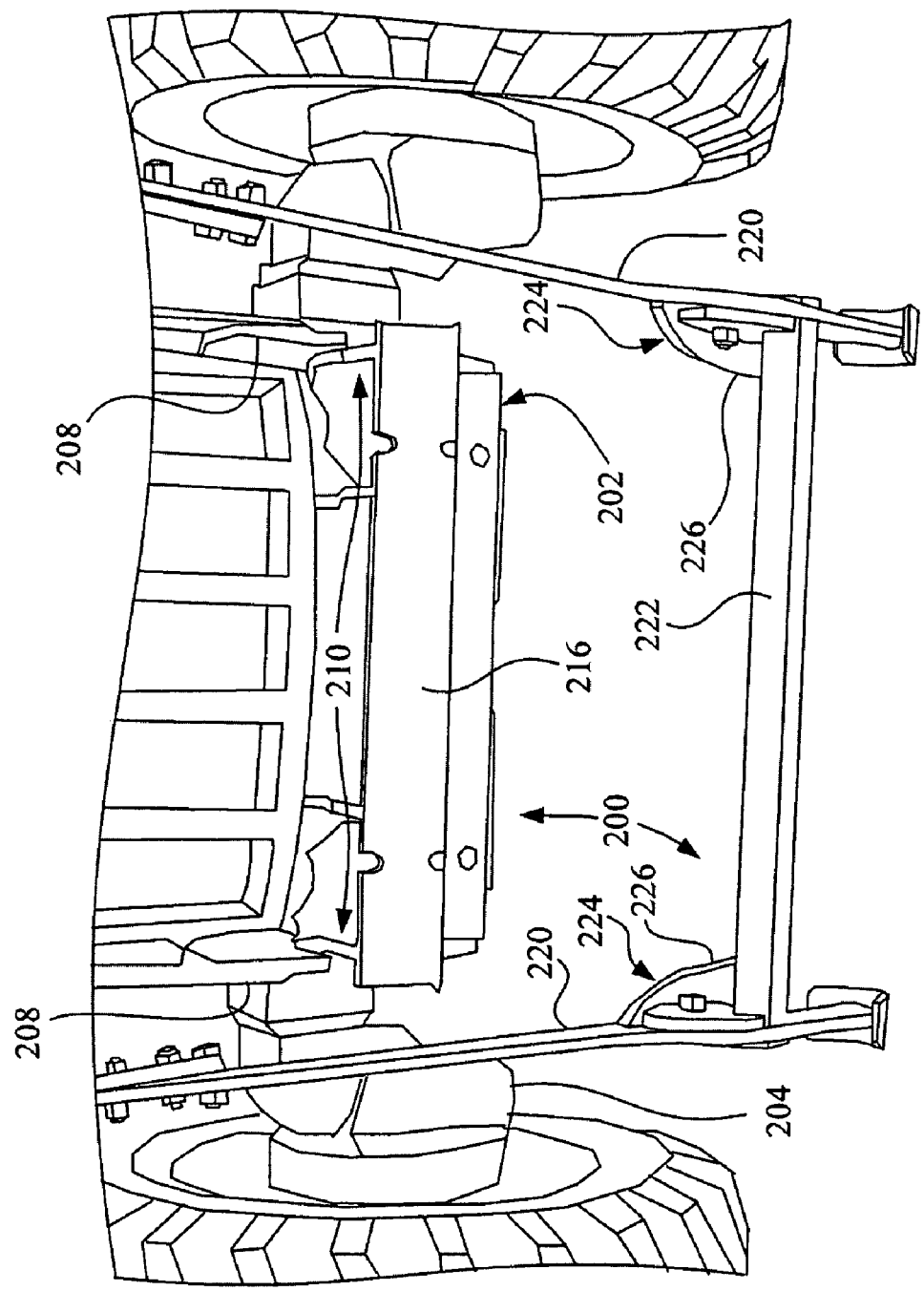
FIG. 3 is a fragmentary, perspective view of the front portion of an embodiment of the loader and front latch system of the present invention, with the braces in engagement with the ground.
Figure 4:
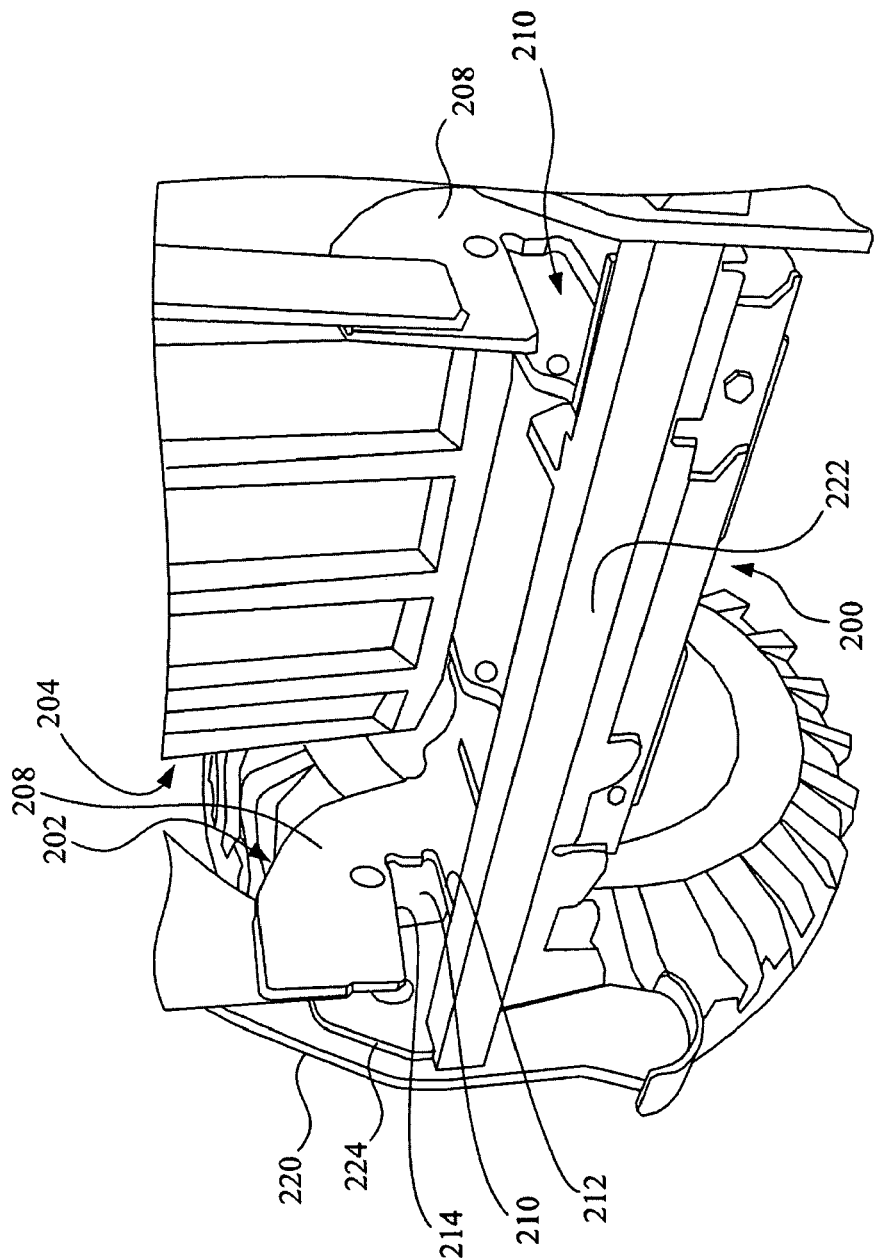
FIG. 4 is another fragmentary, perspective view of the front portion of the loader and front latch system of FIG. 3, with the braces and cross member in a raised position forward of the front latch system.
Figure 5:
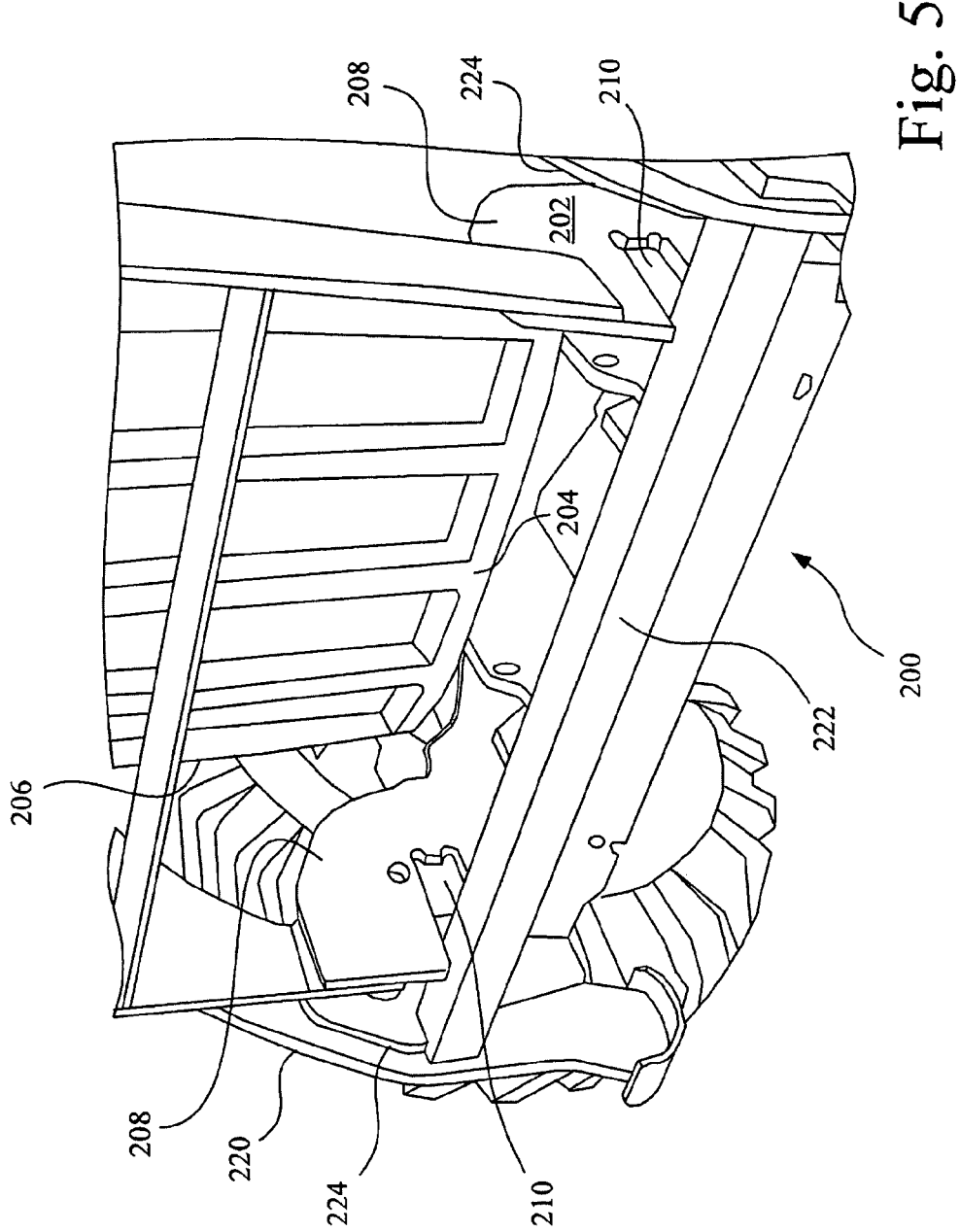
FIG. 5 is another fragmentary, perspective view of the front portion of the loader and front latch system of FIGS. 3 and 4, with the cross member against the upper edge of the slot in the front latch system.
Figure 6:
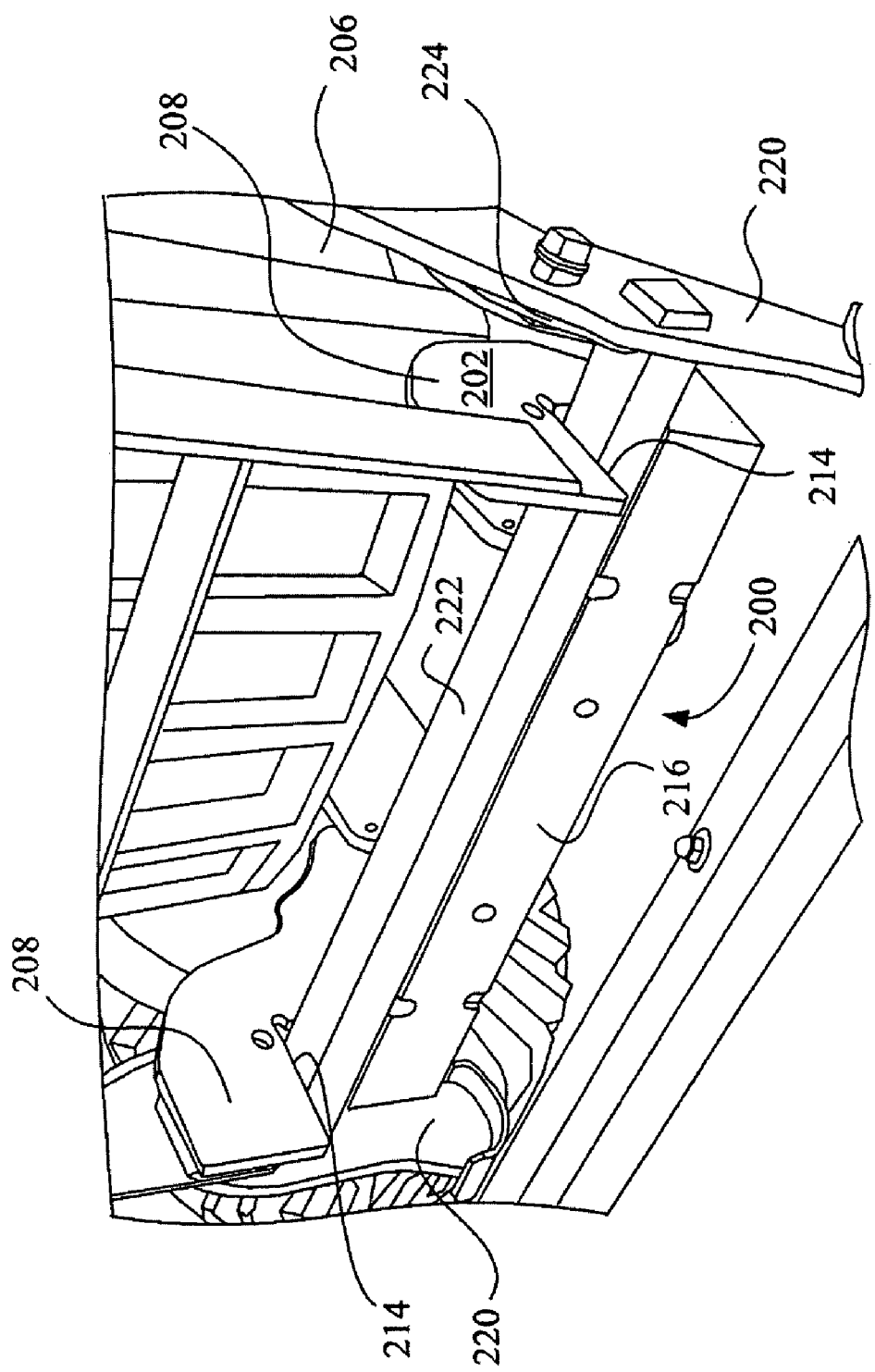
FIG. 6 is another fragmentary, perspective view of the front portion of the loader and front latch system of FIGS. 3-5, with the cross member slid against the base of the slot in the front latch system.
Figure 7:
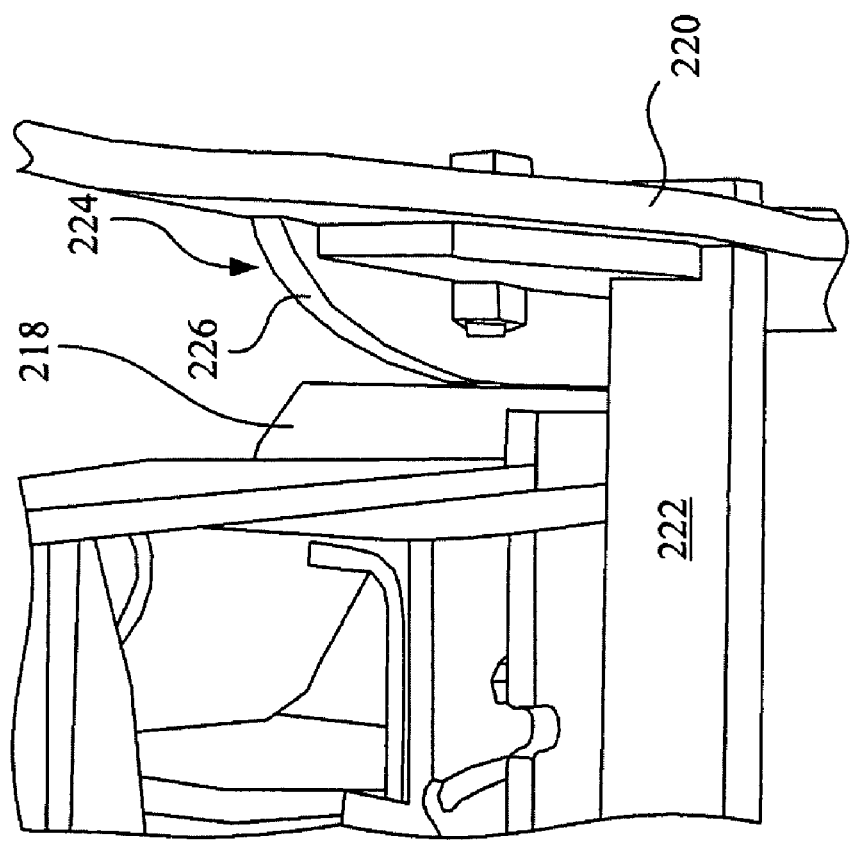
FIG. 7 is another fragmentary, perspective view of the front portion of the loader and front latch system of FIGS. 3-6, showing the lateral plates and guide brackets.
Figure 8:
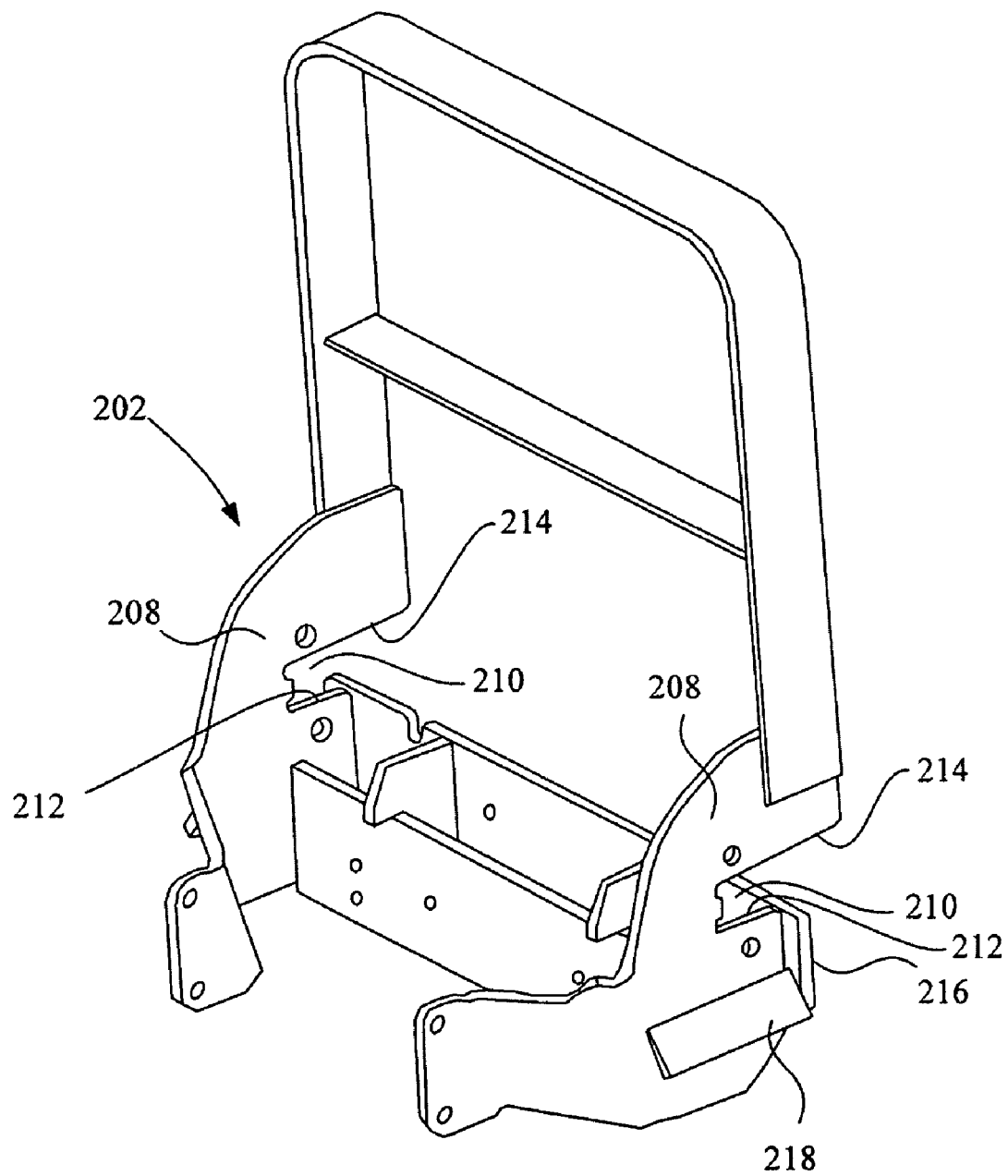
FIGS. 8 and 9 are perspective views of the mounting bracket forming part of the front latch system of the present invention.
Figure 9:
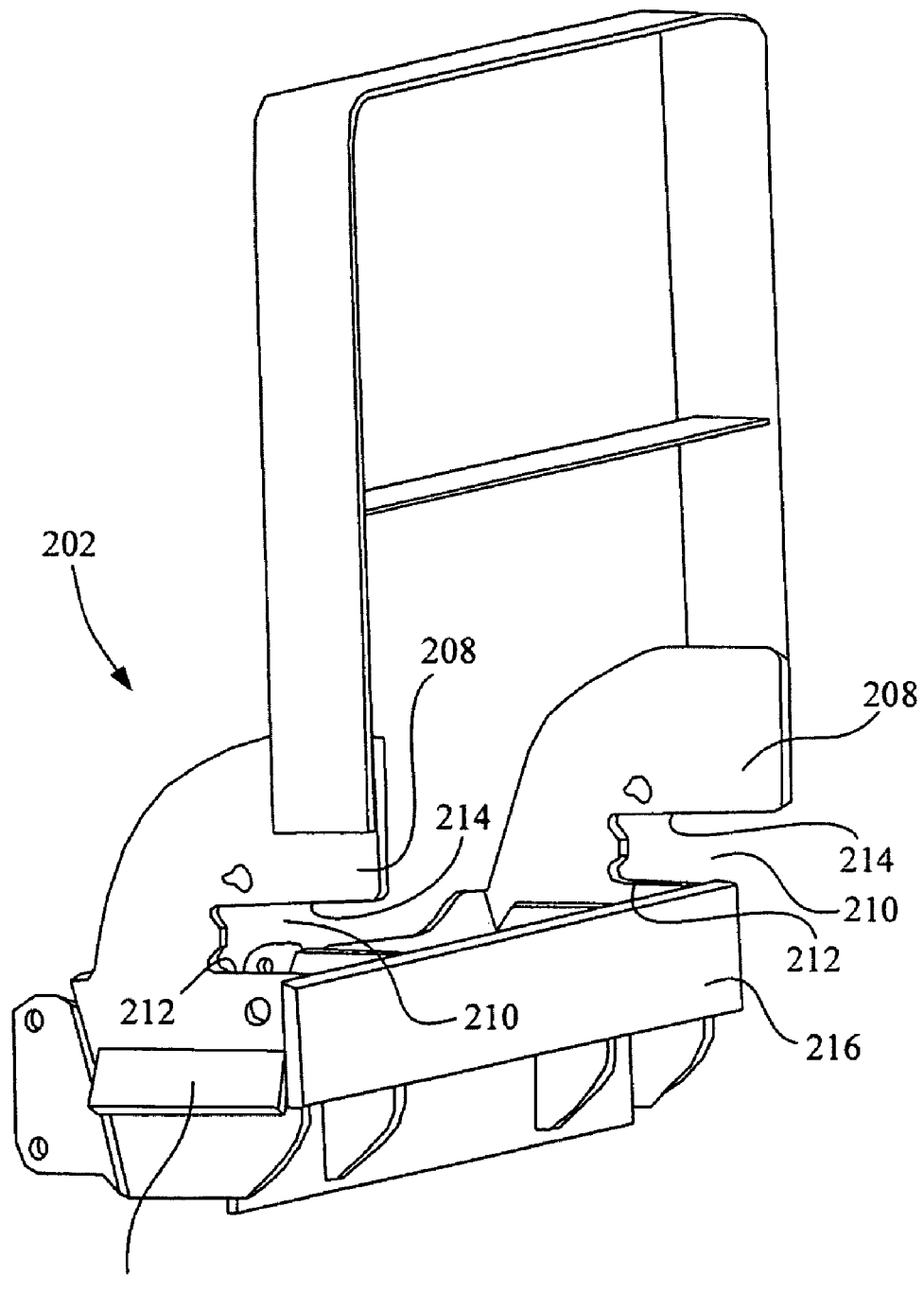
Figure 10:
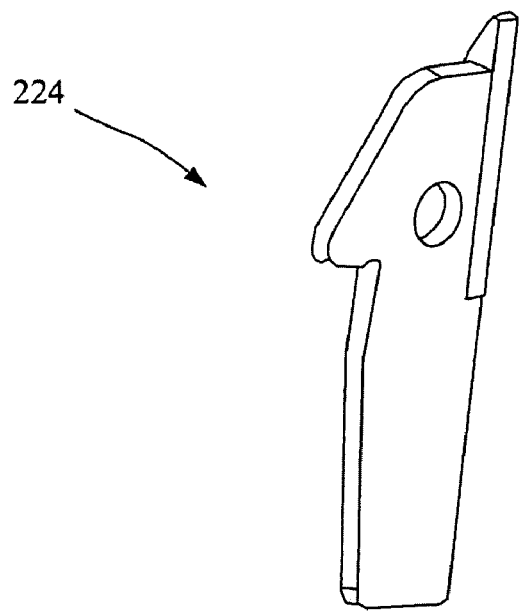
FIGS. 10 and 11 are perspective and side views, respectively, of the guide bracket forming part of the front latch system of the present invention.
Figure 11:
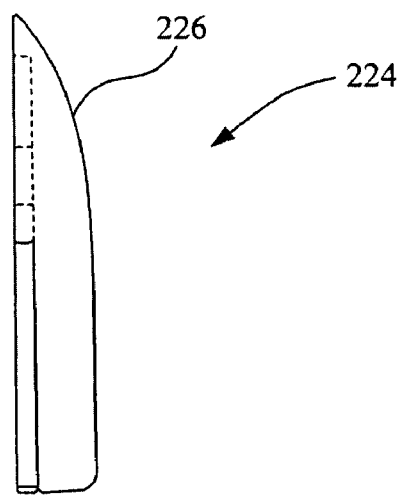

An example of a front end loader with a front latch system is disclosed in U.S. Pat. No. 7,281,890 (the '890 patent), which is assigned to the assignee of the present invention and incorporated herein by reference. Referring to FIGS. 1 and 2 in the '890 patent, a loader includes on either side a mast 24, boom 26 and brace 28 (reference numbers from the '890 patent are used herein for ease of following along). The brace 28 latches with the front end of tractor frame 22 when loader assembly 20 is in a mounted position, and supports loader assembly 20 in a raised, parked position when loader assembly 20 is dismounted from frame 22. The terms "front" or "forward", as used herein, refer to the front of the loader or work machine. Mast 24 includes a lower end which slidably engages and locks with a laterally extending tractor frame portion 42. A camming arrangement 82 is manually engaged/disengaged from the operator's station and holds brace 28 in place relative to mast 24 when brace 28 is coupled with the front portion 40 of tractor frame 22, as shown in FIG. 1.

The present invention may utilize a loader assembly with a sliding arrangement at the lower end of each mast, and a camming arrangement at the rear end of each brace, similar to that disclosed in the '890 patent. However, it is also possible that other types of mounting configurations may be possible at the rear end of the loader assembly. The primary difference in comparison with the present invention is the front latch system which attaches to the front portion of the tractor frame.

In the '890 patent, an upper contact member 68 and a lower contact member 70 extend between the distal ends of braces 28. Upper contact member 68 has a square cross section and is received on top of a shelf like segment 72 at the front of tractor frame 22. Lower contact member 70 has a circular cross section and is received generally under and rearward of tabs 76. A pair of ears 80 which are affixed to lower contact member 70 latch in place in front of tabs 76. Two pairs of secondary guides 115 assist in lateral centering of lower contact member 70 relative to front portion 40 of frame 22 as the unit is being raised to a mounted position.

Referring now to FIGS. 3-11, conjunctively, according to an aspect of the present invention, a front latch system 200 includes a mounting bracket 202 which is attached to the front of a work machine frame 204. In the embodiment shown, mounting bracket 202 defines a hood guard for protecting the front of the engine hood 206, but need not necessarily be configured as a hood or brush guard. Similarly, mounting bracket 202 does not have to be a separate piece that is attached to the frame 204. Rather, frame 204 could be configured to integrally include mounting bracket 202.

Mounting bracket 202 includes a pair of laterally spaced, generally vertically oriented plates 208, with each plate 208 having a generally horizontally oriented slot 210. Each slot 210 includes a lower edge 212 and a longer upper edge 214. Each upper edge 214 extends in front of a front plate 216. A pair of downwardly angled lateral plates 218 assist in lateral centering of the front end of braces 220 on the loader assembly, as will be described in more detail below. Lateral plates 218 need not necessarily be angled downwardly, but are shown as such in the illustrated embodiment to allow foreign matter (e.g., crop residue) to fall off.

The present invention uses only a single contact member or cross member 222 that extends between the front ends of braces 220 (as compared with the upper and lower contact members required by the front latch system shown in the '890 patent). Cross member 222 has a square cross section in the embodiment shown, but could have a rectangular or other shaped cross section, depending on the configuration. Cross member 222 is sized to just fit into and slide horizontally within slot 210.

A pair of guide brackets 224 are respectively carried at a front end of each brace 220. Each guide bracket 224 has a laterally inward, ramped guide surface 226 that may engage with a laterally outward edge of a corresponding lateral plate 218. Each guide bracket 224 is positioned laterally outside of a corresponding lateral plate 218 when cross member 222 is in a seated position at the base of slot 210.

During attachment of the loader, as the parking stands rotate up, the square cross member 222 contacts the longer upper edge 214 of the slot, stopping rotation and thus causing the square cross member 222 to slide rearward into the slot 210 until the mast rotation is complete and the cam arrangement can be latched. Latch system 200 is not dependent upon the geometry of the tractor front frame as is the case with the design shown in the '890 patent, where the tractor front frame is clamped between the lower swinging frame and the square bar. For detachment of the loader, the process is simply reversed.

The present invention provides another way of securing the front of a loader parking system to a tractor that does not have the same geometry as existing tractors, allowing the use and retrofitting of a current loader. With this system the loader still has the one trip off the tractor parking feature but is a simpler, more cost effective and more versatile design. The present invention eliminates the current swinging lower front frame with the round bar shown in the '890 patent, which is used to stop the rotation during attachment of the loader, and is replaced by mounting brackets with a slot for a single cross member, where the upper edge of the slot is longer and used to stop the rotation.

The present invention is a much simpler latch system that can be incorporated into the hood guard, but does not have to be, and is not dependent on the geometry of the tractor front frame. The one trip off the tractor parking feature is still maintained and the lower swinging front frame is eliminated. This also allows more flexibility to use current loaders on tractors that do not have similar front frames.

Having described the preferred embodiment, it will become apparent that various modifications can be made without departing from the scope of the invention as defined in the accompanying claims.

The invention claimed is:

1. A work machine, comprising:
   a frame;
   a front latch system carried by said frame at a front end of said work machine, said latch system including a pair of laterally spaced, generally vertically oriented plates with said pair of plates respectively containing a pair of laterally spaced, generally horizontally oriented slots, each said slot defined by an upper edge and a lower edge, said upper edge being longer than said lower edge and extending forward of said lower edge; a pair of lateral plates being respectively joined to and extending laterally outward from said pair of vertically oriented plates at respective locations below said slots; and
   a loader including a pair of laterally spaced braces, each said brace having a front end configured for contacting the ground when said loader is detached from said frame, and a cross member coupled between said braces, said cross member being received within said slots of said front latch system; and a pair of guide brackets attached to said braces, each bracket including a ramped guide surface configured to co-act with one of said lateral plates during attachment of said loader to said frame.

2. The work machine of claim 1, wherein said front latch system is one of attached to and integral with said frame.

3. The work machine of claim 1, wherein said front latch system includes a mounting bracket which is separate from and attached to said frame, said mounting bracket including said pair of laterally spaced, generally vertically oriented plates.

4. The work machine of claim 3, further including a front plate extending between said vertically oriented plates, said upper edge of each said slot extending forward of said front plate.

5. The work machine of claim 1, wherein said loader includes a pair of masts and a pair of booms, each said brace having a distal end coupled to a respective one of said pair of booms, each said mast being substantially rigidly connected with said frame when said loader is attached to said frame, such that said cross member is retained within said slot.

6. The work machine of claim 1, wherein said cross member has one of a square cross section, rectangular cross section and round cross section.

7. The work machine of claim 1, wherein said work machine comprises one of an agricultural work machine, construction work machine and industrial work machine.

* * * * *